(12) United States Patent
Watanabe

(10) Patent No.: US 11,915,569 B2
(45) Date of Patent: Feb. 27, 2024

(54) SMOKE DETECTOR

(71) Applicant: NOHMI BOSAI LTD., Tokyo (JP)

(72) Inventor: Takahiro Watanabe, Tokyo (JP)

(73) Assignee: NOHMI BOSAI LTD., Tokyo (JP)

( * ) Notice: Subject to any disclaimer, the term of this patent is extended or adjusted under 35 U.S.C. 154(b) by 360 days.

(21) Appl. No.: 17/434,676

(22) PCT Filed: Mar. 16, 2020

(86) PCT No.: PCT/JP2020/011489
§ 371 (c)(1),
(2) Date: Mar. 7, 2022

(87) PCT Pub. No.: WO2020/189630
PCT Pub. Date: Sep. 24, 2020

(65) Prior Publication Data
US 2022/0319290 A1 Oct. 6, 2022

(30) Foreign Application Priority Data
Mar. 19, 2019 (JP) .................................. 2019-051478

(51) Int. Cl.
*G08B 17/10* (2006.01)
*G01N 21/53* (2006.01)
*G08B 17/107* (2006.01)

(52) U.S. Cl.
CPC ........... *G08B 17/107* (2013.01); *G01N 21/53* (2013.01)

(58) Field of Classification Search
CPC .. G08B 17/107; G08B 29/043; G08B 17/113; G01N 21/53
See application file for complete search history.

(56) References Cited

U.S. PATENT DOCUMENTS

| 8,134,710 B2 * | 3/2012 | Kajino ................. G01N 21/538 |
| | | 340/630 |
| 10,809,173 B2 * | 10/2020 | Deliwala ............. G08B 17/103 |
| 2022/0317012 A1 * | 10/2022 | Cole .................. G01N 15/1434 |

FOREIGN PATENT DOCUMENTS

| JP | S53-61298 A | 6/1978 |
| JP | H05-73784 A | 3/1993 |
| JP | 2015-191462 A | 11/2015 |

OTHER PUBLICATIONS

An Office Action mailed by China National Intellectual Property Administration dated Jun. 13, 2022, which corresponds to Chinese Patent Application No. 202080018513.9 and is related to U.S. Appl. No. 17/434,676; with English language translation.

(Continued)

*Primary Examiner* — Toan N Pham
(74) *Attorney, Agent, or Firm* — Studebaker & Brackett PC

(57) ABSTRACT

A light-receiving element and a first light-emitting element are disposed in a position in which the light-receiving element receives forward-scattered light produced when smoke in the smoke detection part is irradiated with first irradiation light emitted from the first light-emitting element. A secondary reflecting plate is provided on a side of the first light-emitting element inside the peripheral wall. The secondary reflecting plate is configured to form secondary reflected light when the smoke detection part without smoke is irradiated with the first irradiation light. The secondary reflecting plate receives primary reflected light resulting from reflection of the first irradiation light from the peripheral wall and reflects the primary reflected light, and then allows the formed secondary reflected light to enter the light-receiving element.

5 Claims, 7 Drawing Sheets

(56) References Cited

OTHER PUBLICATIONS

International Search Report issued in PCT/JP2020/011489; dated May 26, 2020.

* cited by examiner

SMOKE DETECTOR

TECHNICAL FIELD

The present invention relates to a photoelectric smoke detector configured to detect smoke by scattered light.

BACKGROUND ART

A spot type photoelectric smoke detector detects smoke by using the scattering of light. This smoke detector includes a light-receiving element which is disposed in a position displaced from the optical axis of a light-emitting element. Then, when there is smoke in a smoke detection part around the optical axis, scattered light is produced and enters the light receiving unit, so that the smoke is detected. Patent Literature 1 describes a smoke detector configured to detect smoke by forward-scattered light and backward-scattered light.

CITATION LIST

Patent Literature

PTL1: Japanese Patent Application Laid-Open No. 2015-191462

SUMMARY OF INVENTION

Technical Problem

An optical bench surrounding the smoke detection part configured to detect the scattered light is made of, for example, black resin. This is to prevent outside light from passing though the optical bench, and also to prevent error detection by blacking the inside of the optical bench to improve light absorption in order to prevent stray light and so forth from reflecting from the inside of the optical bench and entering the light-receiving element. Meanwhile, there is a technology using the reflected light which is emitted from the light-emitting element and reflects without being absorbed in the inside of the optical bench, in order to detect whether the light-emitting element and the light-receiving element normally function. In this case, they do not normally function when there is either too little or too much reflected light in the inside of the optical bench. It is therefore an object of the present invention to achieve a suitable amount of reflected light inside the optical bench.

Solution to Problem (1) A first aspect of the present invention provides a smoke detector including: a smoke introduction part; a smoke detection part provided above the smoke introduction part and surrounded on its side by a peripheral wall; a first light-emitting element; and a light-receiving element. The light-receiving element and the first light-emitting element are disposed in a position in which the light-receiving element receives forward-scattered light produced when smoke in the smoke detection part is irradiated with first irradiation light emitted from the first light-emitting element. A secondary reflecting plate is provided on a side of the first light-emitting element inside the peripheral wall. The secondary reflecting plate is configured to form secondary reflected light when the smoke detection part without smoke is irradiated with the first irradiation light. The secondary reflecting plate receives primary reflected light resulting from reflection of the first irradiation light from the peripheral wall and reflects the primary reflected light, and then allows produced secondary reflected light to enter the light-receiving element.

According to the present invention, it is possible to increase the reflected light entering the light-receiving element when there is no smoke in the smoke detection part, and check a failure of the first light-emitting element and the light-receiving element.

(2) A second aspect of the present invention provides the smoke detector described in (1). The second light-emitting element is disposed in a position in which the light-receiving element receives backward-scattered light produced when smoke in the smoke detection part is irradiated with second irradiation light emitted from the second light-emitting element. The peripheral wall includes a primary reflection region from which the second irradiation light emitted from the second light-emitting element is reflected when the smoke detection part without smoke is irradiated with the second irradiation light, the primary reflection region being a deflective reflecting wall configured to reflect the second irradiation light in a direction different from the direction in which the second irradiation light enters. The light-receiving element is accommodated in a light-receiving element accommodation wall projecting inside the peripheral wall. The second irradiation light reflects from the deflective reflecting wall, and is guided to a side of the light-receiving element accommodation wall which is opposite to the second light-emitting element. Here, "the light-receiving element is accommodated in the light-receiving element accommodation wall projecting inside the peripheral wall" includes a state where part of the light-receiving element accommodation wall except for the peripheral wall does not surround the light-receiving element.

According to the present invention, it is possible to reduce the reflected light entering the light-receiving element when there is no smoke in the smoke detection part to improve the SN ratio, and consequently to improve the accuracy and quality of the smoke detection.

(3) A third aspect of the present invention provides the smoke detector described in (2). Part of the deflective reflecting wall close to the light-receiving element projects outward.

According to the present invention, it is possible to guide the reflected light to a position to prevent the reflected light from entering the light-receiving element without narrowing the smoke detection part.

(4) A fourth aspect of the present invention provides the smoke detector described in (2) or (3) further including a light blocking plate between the first light-emitting element and the second light-emitting element. The light blocking plate includes a flat surface along a direction in which the second light-emitting element faces.

According to the present invention, it is possible to prevent the irradiation light from the first light-emitting element from directly entering the light-receiving element, without hindering the smoke detection part from being irradiated with the irradiation light, and hindering the scattered light from entering the light-receiving element.

Advantageous Effect

It is possible to achieve a suitable amount of reflected light entering the light-receiving element, and therefore to detect whether the light-emitting element and the light-receiving element normally function. Moreover, it is possible to prevent the reflected light from excessively entering the light-receiving element, and therefore to improve the SN ratio, so as to improve the accuracy and quality of the smoke detection.

DESCRIPTION OF EMBODIMENTS

Hereinafter, an embodiment to practice the present invention will be described. Here, the up-and-down direction is represented by the up-and down of the smoke detector 1 installed on a horizontal ceiling. The same applies to the horizontal direction and the vertical direction.

Figure 1:
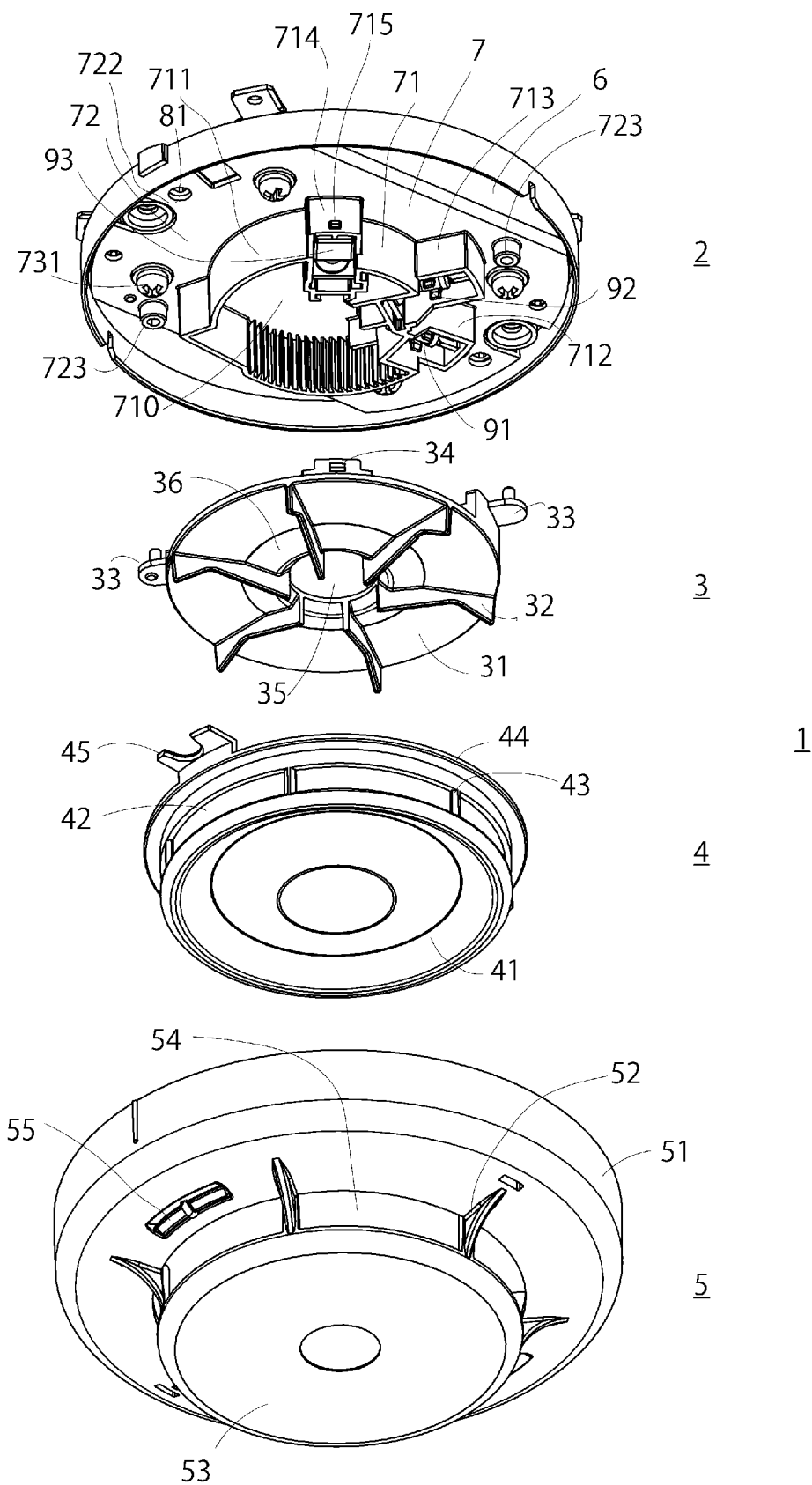
FIG. 1 is an exploded perspective view illustrating a smoke detector 1 according to an embodiment of the present invention.
Figure 2:
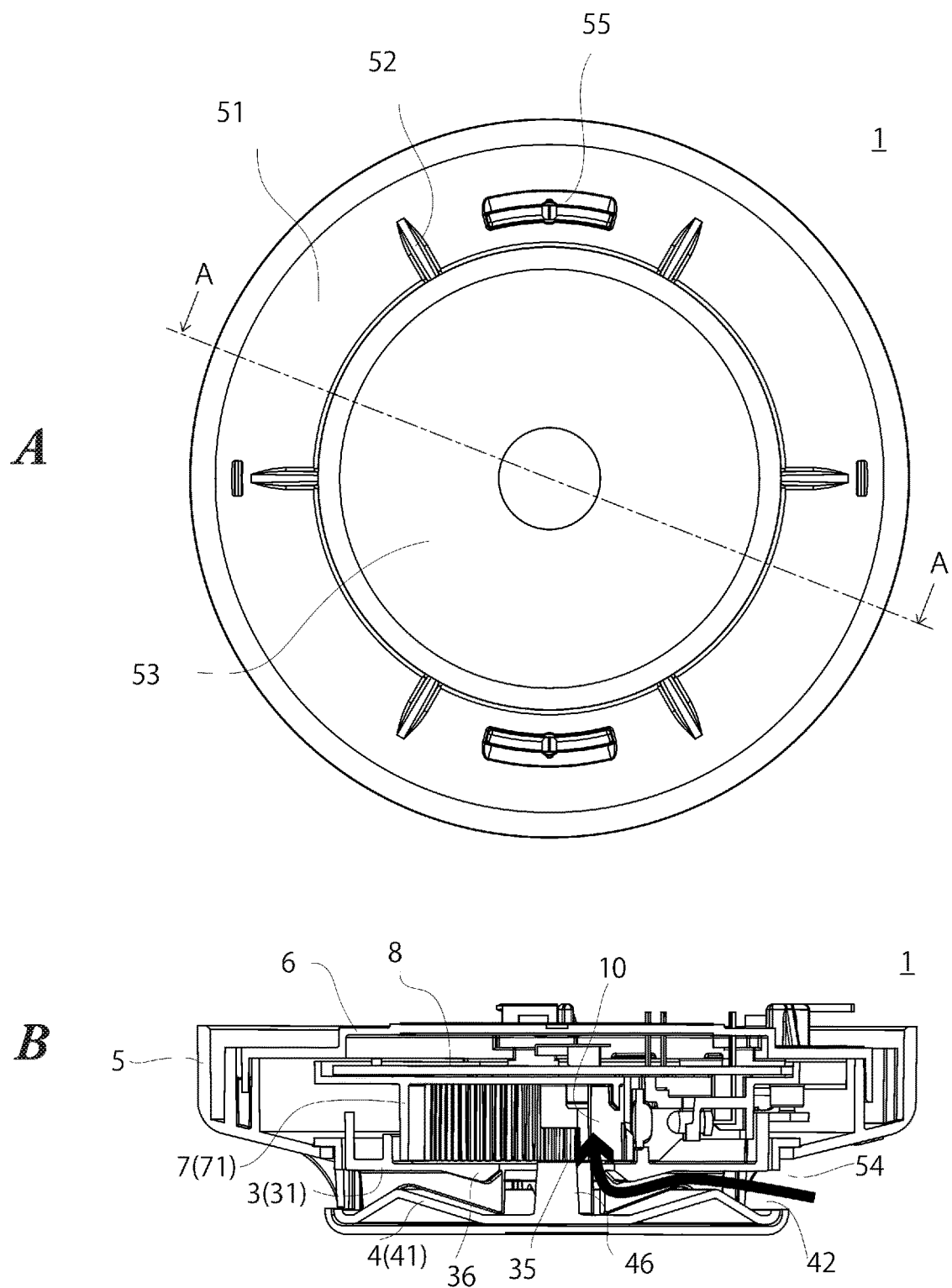
FIG. 2A-2B illustrate a cross section of the smoke detector 1 according to an embodiment of the present invention.

FIG. 1 is an exploded perspective view illustrating the smoke detector 1 according to an embodiment of the present invention, where the smoke detector 1 is taken apart and viewed from obliquely below. The smoke detector 1 is a spot type photoelectric smoke detector, and configured to detect smoke by capturing the scattered light of the irradiation light which irradiates the smoke. The smoke detector 1 includes the detector base 2, a first optical bench cover 3, a second optical bench cover 4, and a cover body 5. In the detector base 2, an optical bench plate 7 is fixed under a back plate 6, and a circuit board 8 (see FIG. 2B) is sandwiched between the back plate 6 and the optical bench plate 7. The optical bench plate 7 includes the optical bench 71 and a plate 72 around the optical bench 71 which are made of black resin and integrally formed. The optical bench 71 includes an upper surface plate 710 provided on its top and a peripheral wall provided in the horizontal direction. The peripheral wall includes a side wall 711, a first light-emitting element accommodation wall 712, a second light-emitting element accommodation wall 713, and a light-receiving element accommodation wall 714. Snap convex portions 715 are provided on the outsides of the peripheral wall, the first light-emitting element accommodation wall 712 and the light-receiving element accommodation wall 714. A first light-emitting element 91 is accommodated in the first light-emitting element accommodation wall 712, a second light-emitting element 92 is accommodated in the second light-emitting element accommodation wall 713, and a light-receiving element 93 is accommodated in the light-receiving element accommodation wall 714. The plate 72 includes screw holes 721 (which are covered with screws 731 in FIG. 2), a light transmission hole 722, and positioning cylindrical portions 723. The light transmission hole 722 allows light from a confirmation lamp 81 provided on the circuit board 8 to be transmitted therethrough.

The first optical bench cover 3 includes a cover disc 31 provided horizontally, smoke introduction fins 32 provided to face downward, positioning legs 33 projecting laterally, and snap pieces 34. The cover disc 31 includes a cover opening 35 which is open in the center of the cover disc 31, and a thick-wall portion 36 formed outside the cover opening 35 and slanting downward and inward with the thickness increasing inward. The snap convex portions 715 are fitted in the snap pieces 34 at three positions while the positioning legs 33 are inserted into the positioning cylindrical portions 723, so that the first optical bench cover 3 is engaged with the detector base 2.

The second optical bench cover 4 includes a circular bottom 41 having concave and convex portions, air ports 42 and connection columns 43 provided on its side part, an annular part 44 provided above the side part, and engagement pieces 45 connected to the annular part 44. The bottom 41 is connected to the annular part 44 by six connection columns 43. The annular part 44 is engaged with the cover body 5 through two engagement pieces 45. A circular insect screen (not illustrated) is fitted in the inside of the air ports 42 and the connection columns 43.

The cover body 5 includes a circular cover outer ring 51, six supports 52 provided to stand under the cover outer ring 51, and a protection plate 53 connected to the lower parts of the supports 52. In addition, the cover body 5 includes openings 54 which are open at six positions and surrounded by the cover outer ring 51, the supports 52, and the protection plate 53. Moreover, a confirmation lamp window 55 in which a transparent resin is fitted is provided in the cover outer ring 51. The smoke introduction fins 32 of the first optical bench cover 3, the connection columns 43 of the second optical bench cover 4, and the supports 52 of the cover body 5 are located in the same positions, respectively.

A smoke detection mechanism has a two layer structure including a lower layer and an upper layer. The lower layer is a smoke introduction part configured to introduce smoke while blocking the outside light between the first optical bench cover 3 and the second optical bench cover 4. The upper layer includes the smoke detection part 10 and is configured to detect smoke between the optical bench 71 and the first optical bench cover 3. The upper layer and the lower layer are separated from one another by the first optical bench cover 3, and communicate with one another via the cover opening 35.

FIGS. 2A-2B illustrate a cross section of the smoke detector 1 according to an embodiment of the present invention. FIG. 2A illustrates the smoke detector 1 viewed from below. FIG. 2B illustrates the cross section taken along line A-A of FIG. 2A. The circuit board 8 is provided above the optical bench plate 7. The circuit board 8 includes the confirmation lamp 81, in addition to a circuit to detect smoke and a circuit to communicate with a receiver (they are not illustrated). The lighting of the confirmation lamp 81 is confirmed from the confirmation lamp window 55 of the cover body 5 (see FIG. 1) via the light transmission hole 722 of the plate 72. The first optical bench cover 3 is provided between the optical bench plate 7 and the second optical bench cover 4, and includes the cover opening 35 which is open in its center. The second optical bench cover 4 includes a bottom 41 having a circular convex portion, and a crisscross projection plate 46. The crisscross projection plate 46 is provided in the center of the bottom 41 and projects crisscross when viewed from above.

FIG. 2B illustrates a state where smoke enters the smoke detection part 10 from the right of the drawing. An arrow indicates the progression of the smoke. The smoke passes through the opening 54 of the cover body 5, the air port 42 of the second optical bench cover 4, and a smoke introduction part between the first optical bench cover 3 and the second optical bench cover 4. Then, the smoke is blocked by the crisscross projection plate 46 and passes through the cover opening 35 of the first optical bench cover 3, and then reaches the smoke detection part 10. In the smoke detection part 10, the smoke is irradiated with the irradiation light emitted from the first light-emitting element 91 and the second light-emitting element 92, and scattered light is received by the light-receiving element 93. The upper part and the lower part of the smoke introduction part have circular convex portions, respectively, to block the outside light. The smoke moves up and then down, and moves up again, enters the upper layer from the cover opening 35, and reaches the smoke detection part 10.

The optical bench plate 7, the first optical bench cover 3, and the second optical bench cover 4 are made of black resin. Then, the outside light is blocked mainly by the bottom 41 of the second optical bench cover 4, the cover disc 31 of the first optical bench cover 3, and the optical bench 71 of the optical bench plate 7, and therefore does not reach the smoke detection part 10.

Figure 3:
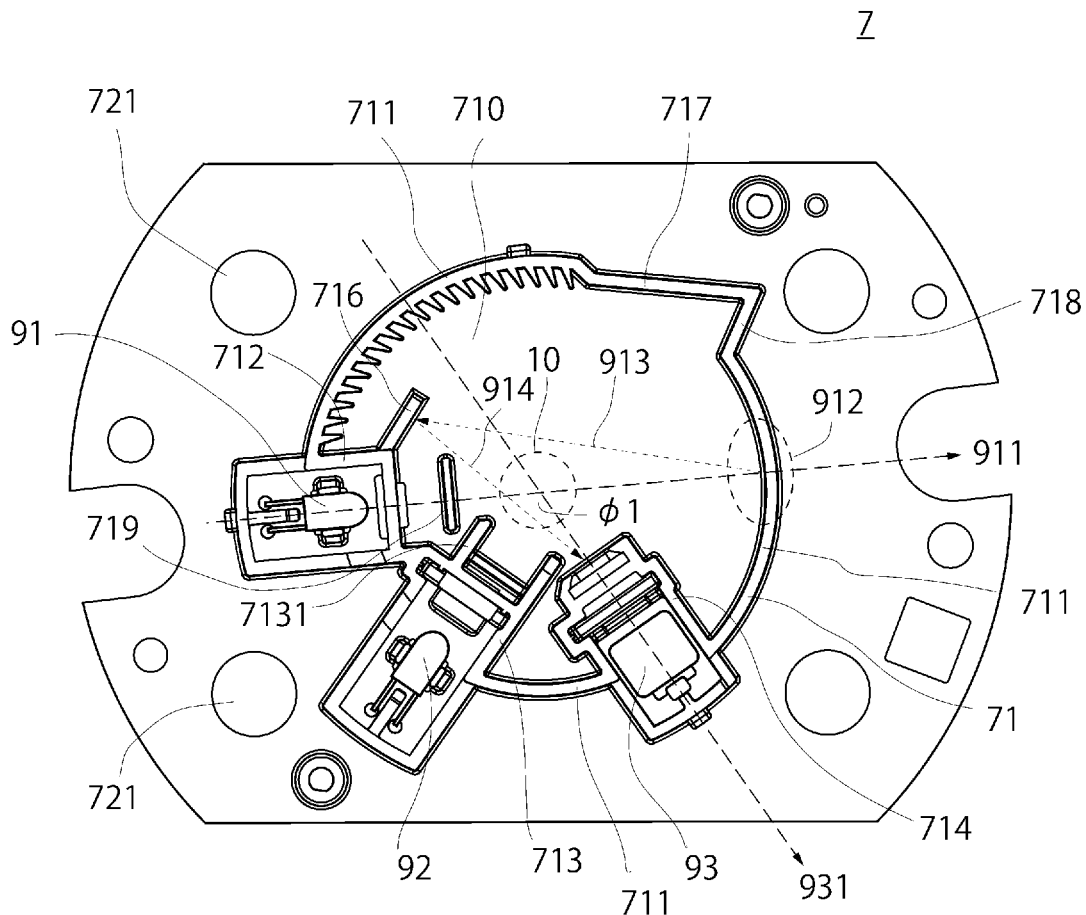
FIG. 3 illustrates forward scattering according to an embodiment of the present invention.

FIG. 3 illustrates forward scattering according to an embodiment of the present invention. FIGS. 3, and 5 to 7 illustrate views enlarged from FIG. 2. FIG. 3 illustrates the bottom surface of the optical bench plate 7 to which the first light-emitting element 91, the second light-emitting element 92 and the light-receiving element 93 are attached. In the optical bench 71 of the optical bench plate 7, a side wall 711 is suspended from below the upper surface plate 710. The first light-emitting element 91, the second light-emitting element 92, and the light-receiving element 93 are accommodated in the first light-emitting element accommodation wall 712, the second emitting element accommodation wall 713, and the light-receiving element accommodation wall 714, respectively, and are connected to the circuit board 8 via small holes provided in the optical bench plate 7. The first light-emitting element accommodation wall 712, the second light-emitting element accommodation wall 713, and the light-receiving element accommodation wall 714 are disposed across the inside and outside of the arc-shaped side wall 711. These parts disposed inside the side wall 711 constitute part of the peripheral wall. In addition, a deflective reflecting wall 717 is provided outward from the circumference of the side wall 711 having an approximately circumferential shape. Part of the deflective reflecting wall 717 near the light-receiving element 93 projects outward, and the projecting end is connected to the side wall 711 via a connection wall 718. The peripheral wall of the optical bench 71 is constituted by the side wall 711, the first light-emitting element accommodation wall 712, the second light-emitting element accommodation wall 713, the light-receiving element accommodation wall 714, the deflective reflecting wall 717, and the connection wall 718. The side wall 711 is formed in an arc, and part of the side wall 711 includes a plurality of small convex portions formed on its inside. First irradiation light from the first light-emitting element 91 and second irradiation light from the second light-emitting element 92 are emitted to the smoke detection part 10. The first light-emitting element accommodation wall 712 includes a front side wall, both lateral side walls, a back side wall in the horizontal direction of the first light-emitting element 91. The front side wall has an opening to allow light to be transmitted therethrough. Then, part of the lateral side walls and the front side wall constitute part of the peripheral wall. The same applies to the second light-emitting element accommodation wall 713 and the light-receiving element accommodation wall 714. The upper surface plate 710 of the optical bench 71 and the plate 72 are disposed in the same position in the vertical direction. The part of each of the first light-emitting element accommodation wall 712, the second light-emitting element accommodation wall 713 and the light-receiving element accommodation wall 714 except the peripheral wall projects less from the plate 72 than the part corresponding to the peripheral wall. The distance from the upper surface plate 710 and the plate 72 to the lower end of the peripheral wall is constant.

An upper surface light blocking plate 719 projects downward from the upper surface plate 710 on the light emitting side of the first light-emitting element accommodation wall 712. The upper surface light blocking plate 719 does not reach a first optical axis 911 which is the optical axis of the first light-emitting element 91. Meanwhile, a light blocking plate 7131 projects from the second light-emitting element accommodation wall 713.

The flat surface of the light blocking plate 7131 is provided along the direction in which the second light-emitting element 92 faces to block the light in order to prevent the first irradiation light from the first light-emitting element 91 from directly reaching the light-receiving element 93.

The first optical axis 911 which is the optical axis of the first light-emitting element 91 and a light receiving axis 931 which is the optical axis of the light-receiving element 93 cross one another at an obtuse angle as φ1 illustrated in FIG. 3 in the region of the smoke detection part 10. Therefore, when there is smoke in the smoke detection part 10, forward-scattered light of the first light-emitting element 91 is captured by the light-receiving element 93. As for the positional relationship, the light-receiving element 93 and the first light-emitting element 91 are disposed in the position in which the light-receiving element 93 receives the forward-scattered light produced when the smoke in the smoke detection part 10 is irradiated with the first irradiation light emitted from the first light-emitting element 91.

When there is no smoke in the smoke detection part 10, no forward scattering occurs, but the first irradiation light reflects from the inner surface of the peripheral wall of the optical bench 71 several times, and is finally received by the light-receiving element 93. Therefore, a little amount of received light for no malfunction is detected, that is, a so-called noise is detected. Although the optical bench 71 is made of black resin, it does not completely absorb the first irradiation light but reflects part of the first irradiation light. Using this reflected light, the present application checks whether the first light-emitting element 91 and the light-receiving element 93 normally function. When the light emitting or the light receiving fails, the amount of received light for no malfunction is not detected, and therefore it is possible to detect the failure. The light emitting and the light receiving are constantly performed in the normal state in which there is no smoke in the smoke detection part 10, and therefore it is possible to detect the failure without delay when the failure occurs as mentioned above.

Figure 4:
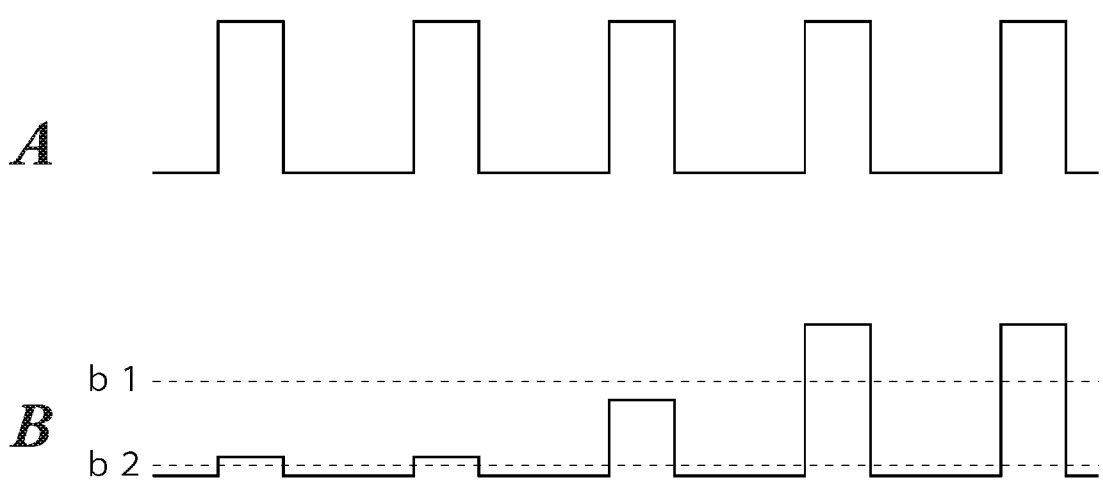
FIGS. 4A-4B illustrate an amount of emitted light and an amount of received light according to an embodiment of the present invention.
Figure 5:
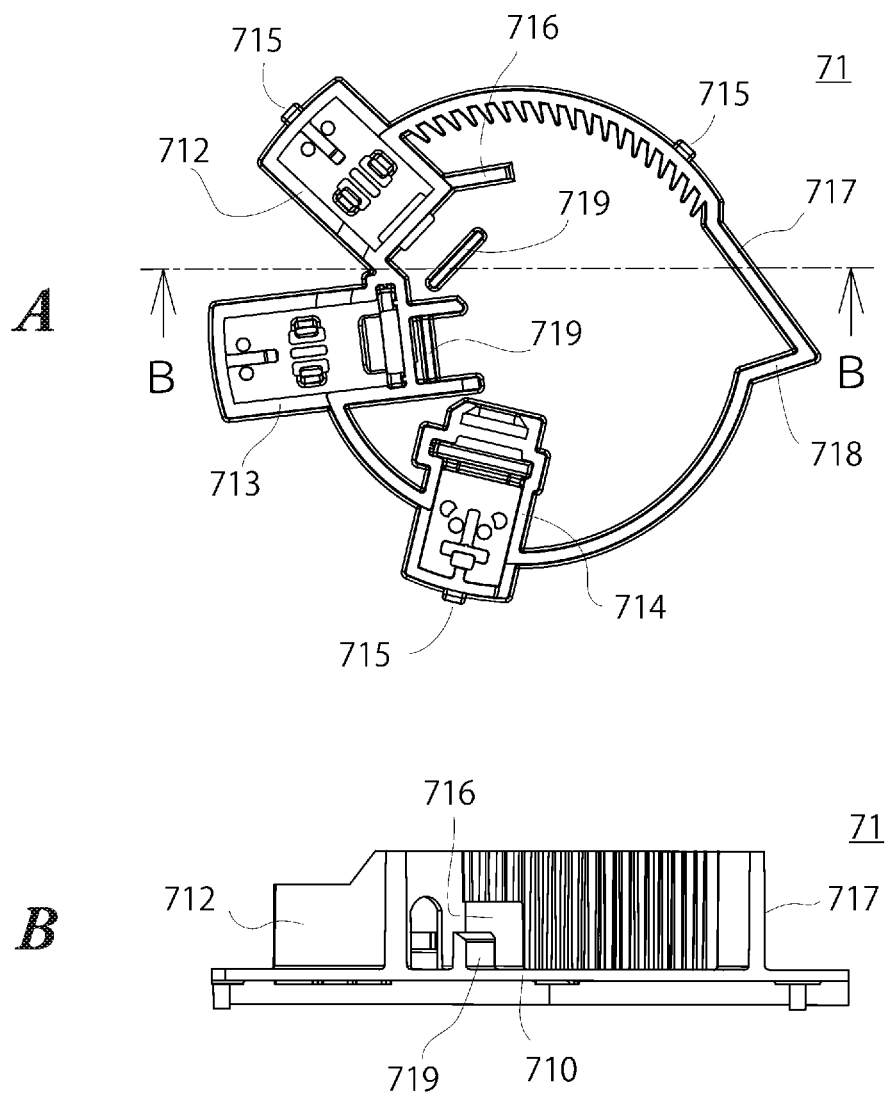
FIGS. 5A-5B illustrate an optical bench 71 according to an embodiment of the present invention.

FIGS. 4A-4B illustrate an amount of emitted light and an amount of received light according to an embodiment of the present invention. The vertical axis indicates the amount of emitted light and the amount of received light, and the horizontal axis indicates time. FIG. 4A illustrates the amount of emitted light by the first light-emitting element 91, and FIG. 4B illustrates the amount of received light by the light-receiving element 93. The first light-emitting element 91 emits light at regular time intervals as illustrated in FIG. 4A. Accordingly, the light-receiving element 93 receives the light at regular time intervals as illustrated in FIG. 4B. In FIGS. 4A-4B, there is no smoke in the smoke detection part 10, forward-scattered light is not produced, and the amount of received light is small for two pulses over the period of time on the left. On the other hand, there is sufficient smoke in the smoke detection part 10, forward-scattered light is produced, and the amount of received light is large for two pulses over the period of time on the right. In FIG. 4B, when the amount of received light is greater than threshold b1, the smoke is detected by the forward scattered light. Then, when the amount of received light is a value between the threshold b1 and threshold b2 which is the amount of received light for no malfunction at the timing of the light emitting, it is detected that there is no smoke and that the light emitting and the light receiving do not fail. Meanwhile, when the amount of received light is smaller than threshold b2, which is the amount of received light for malfunction, it is detected that a failure has occurred.

The color of the optical bench 71 is black and therefore has good light absorption, and the direction of the first optical axis 911 of the first light-emitting element 91 is shifted from that of the light receiving axis 931 of the light-receiving element 93 as illustrated in FIG. 3. The first irradiation light reflects from the inner surface of the optical bench 71 several times, and then reaches the light-receiving element 93, and therefore the amount of received light for no malfunction obtained from the first irradiation light is small. Therefore, the value of the threshold b2 has to be small, and, in order to reduce the threshold b2, the light-receiving element 93 which can detect a little amount of light should be used. Therefore, according to the present invention, the structure of the optical bench 71 allows the amount of received light for no malfunction to be increased within a range to make a difference to the extent that the amount of received light for no malfunction can be compared with the amount of received light when smoke is produced.

The structure that allows the amount of received light for no malfunction to be increased will be described with reference to FIG. 3. When the first irradiation light from the first light-emitting element 91 irradiates the smoke detection part 10 without smoke, the first irradiation light collides with the side wall 711 and reflects from the side wall 711. Although the color of the side wall 711 is black, the side wall 711 cannot completely absorb but reflects the first irradiation light. The first irradiation light is spread around the first optical axis 911, and reaches the side wall 711. At this time, a primary reflection region 912 having a certain size as illustrated in FIG. 3 is produced. Although the primary reflection region 912 is formed on the surface of the side wall 711, it is illustrated as an ellipse viewed from the lower surface in FIG. 3 for convenience. Then, the light is reflected in the direction of the primary reflection axis 913 in the primary reflection region 912. A secondary reflecting plate 716 is provided in the direction of the primary reflection axis 913. The secondary reflecting plate 716 is located inside the peripheral wall and on the side of the first light-emitting element 91 far from the light-receiving element 93. In addition, the side wall 711 includes small convex portions behind the secondary reflecting plate 716 when viewed from the light-receiving element 93. The secondary reflecting plate 716 is provided on the lateral side wall of the first light-emitting element accommodation wall 712 which constitutes part of the peripheral wall projecting inside the optical bench 71 and is far from the light-receiving element accommodation wall 714. The secondary reflecting plate 716 includes a face to reflect primary reflected light to the direction of the light-receiving element 93. Therefore, the primary reflected light reflects from the secondary reflecting plate 716 to the direction of a secondary reflection axis 914 and is changed into secondary reflected light, and then enters the light-receiving element 93. The secondary reflecting plate 716 increases the secondary reflected light of the first light-emitting element 91, so that the amount of received light for no malfunction is increased.

FIGS. 5A-5B illustrate the optical bench 71 according to an embodiment of the present invention. FIG. 5A illustrates the optical bench 71 viewed from below. FIG. 5B illustrates a cross section taken along line B-B. The line B-B runs between the first light-emitting element accommodation wall 712 and the second light-emitting element accommodation wall 713 and through the upper surface light blocking plate 719 and the deflective reflecting wall 717. The lower part of FIG. 5B represents the upper part on the ceiling side. In FIG. 5B, the upper surface light blocking plate 719 projects short from the upper surface plate 710, and the secondary reflecting plate 716 projects behind the upper surface light blocking plate 719 in height as an amount of projection that is about 60% of the peripheral wall such as the side wall 711. By appropriately setting this amount of projection of the secondary reflecting plate 716 from the upper surface side, it is possible to adjust the intensity of the secondary reflected light, and it is preferred that the height is 30 to 90% of the peripheral wall. The upper surface light blocking plate 719 is located lower than the first optical axis 911 of the first light-emitting element 91 accommodated in the first light-emitting element accommodation wall 712 to block the irradiation light emitted from the first light-emitting element 91 toward the upper surface plate 710.

Figure 6:
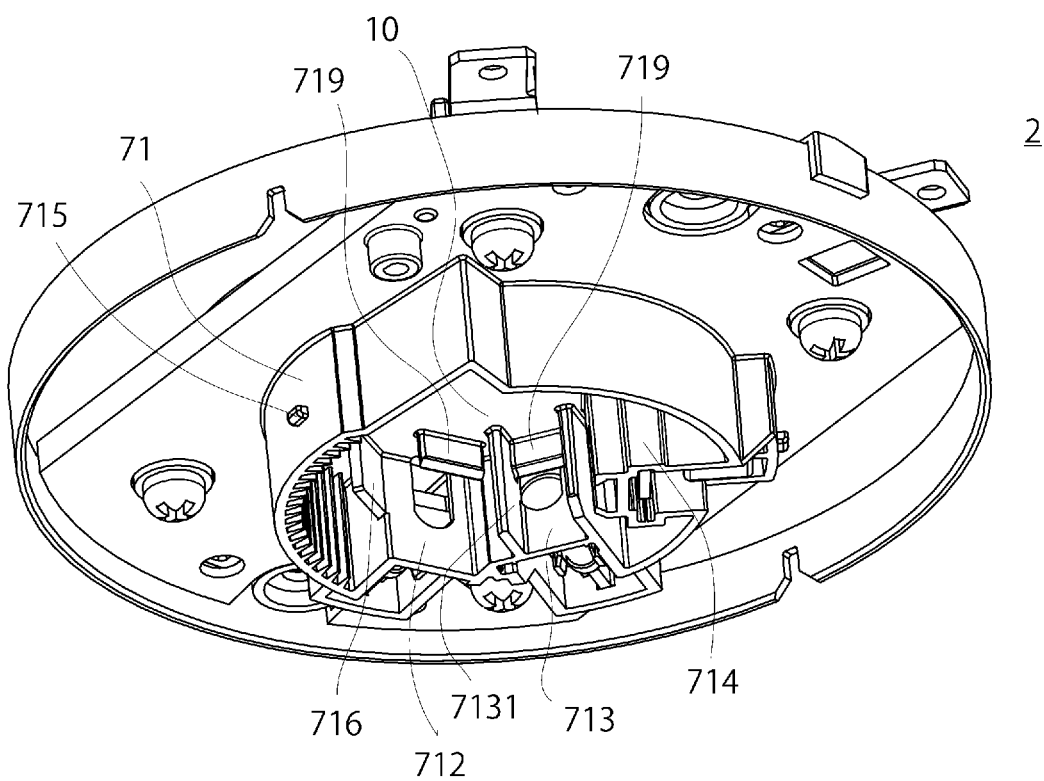
FIG. 6 illustrates a detector base 2 viewed from obliquely below according to an embodiment of the present invention.

FIG. 6 illustrates the detector base 2 viewed from obliquely below according to an embodiment of the present invention. The direction is different from the detector base 2 illustrated in FIG. 1. The first light-emitting element accommodation wall 712 and the second light-emitting element accommodation wall 713 include openings configured to allow the irradiation light to pass therethrough and to be directed to the smoke detection part 10, respectively. Although not illustrated in FIG. 6, the light-receiving element accommodation wall 714 includes an opening. The secondary reflecting plate 716 and upper surface light blocking plates 719 are provided inside the optical bench 71. One of the upper surface light blocking plates 719 is provided on the light detection part 10 side of the opening of the first light-emitting element accommodation wall 712, and the other is provided on the light detection part 10 side of the opening of the second light-emitting element accommodation wall 713 on the light detection part 10 side.

Here, part of the primary reflected light reaches the secondary reflecting plate 716, but the remaining part passes through below and the side (the right side in FIGS. 3 and 5) of the secondary reflecting plate 716, and then is almost absorbed by the small convex portions. By this, the amount of the light that is sufficient to determine whether the first light-emitting element 91 emits light enters into the light-receiving element 93. It is efficiently smaller amount of the light than the amount of the forward-scattered light when fire is recognized. A difference of the amount of the light is secured. Then, it is possible to increase the SN ratio to achieve a more accurate smoke detector.

Figure 7:
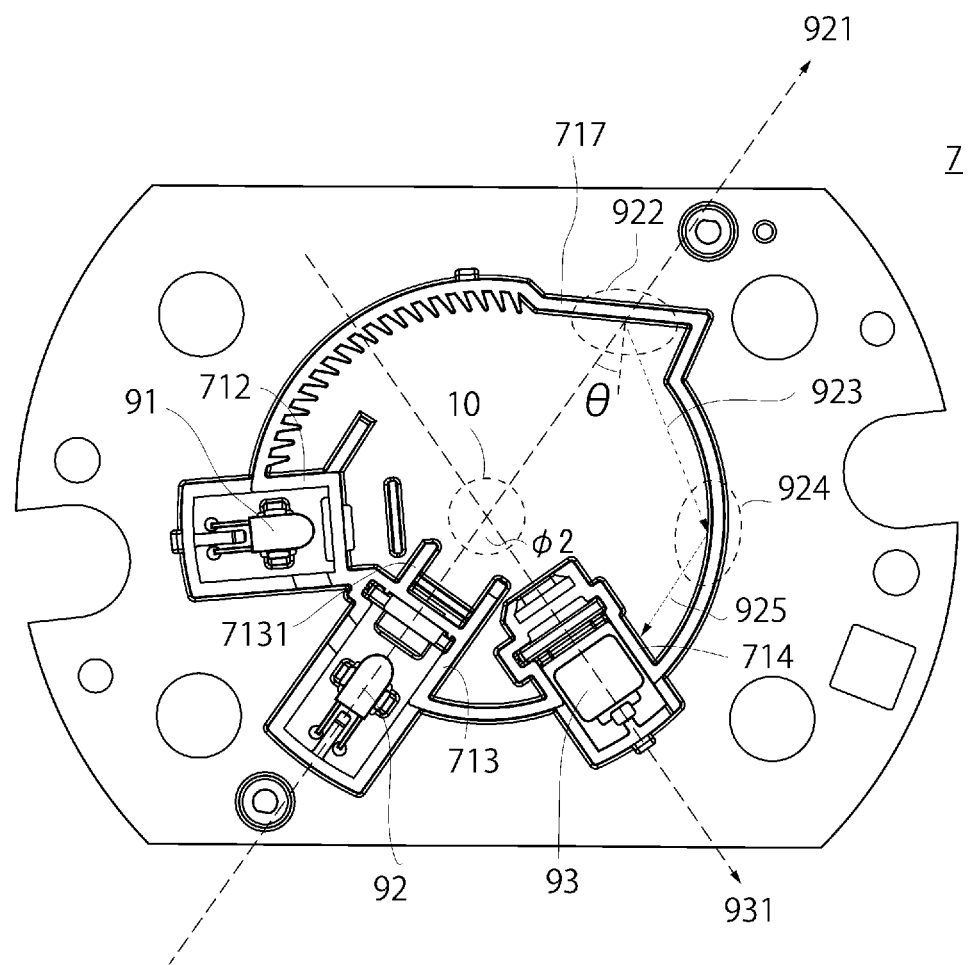
FIG. 7 illustrates backward scattering according to an embodiment of the present invention.

FIG. 7 illustrates backward scattering according to an embodiment of the present invention. Like FIG. 3, FIG. 7 illustrates the bottom surface of the optical bench plate 7 to which the first light-emitting element 91, the second light-emitting element 92 and the light-receiving element 93 are attached. A second optical axis 921 which is the optical axis of the second light-emitting element 92 and the light receiving axis 931 which is the optical axis of the light-receiving element 93 cross one another at an acute angle as φ2 illustrated in FIG. 6 in the region of the smoke detection part 10. Therefore, the light-receiving element 93 captures the backward-scattered light of the second irradiation light emitted from the second light-emitting element 92. As for the positional relationship, the second light-emitting element 92 is disposed in the position in which the light-receiving element 93 receives the backward-scattered light produced when the smoke in the smoke detection part 10 is irradiated with the second irradiation light emitted from the second light-emitting element 92. For the backward scattering, the light-receiving element 93 receives the amount of received light for no malfunction, and therefore it is detected that the second light-emitting element 92 and the light-receiving element 93 do not fail in the same way as the forward scattering. As described with reference to FIGS. 4A-4B, the amount of emitted light and the amount of received light are the same as those of the forward-scattered light. Here, FIG. 4A illustrates the amount of emitted light by the second light-emitting element 92. For the backward scattering, the second light-emitting element 92 and the light-receiving element 93 face approximately the same direction. Therefore, the primary reflected light of the second light-emitting element 92 tends to enter the light-receiving element 93, and consequently the amount of received light for no malfunction which is received by the light-receiving element 93 is increased. By this means, the threshold b1 at which the light-receiving element 93 detects smoke approaches the value of the amount of received light for no malfunction. As a result, the difference (SN ratio) in the amount of received light between the presence and the absence of smoke is reduced, and consequently the accuracy of the smoke detector deteriorates.

According to the present invention, part of the peripheral wall of the optical bench 71 forms the deflective reflecting wall 717 as illustrated in FIG. 7. The vertical axis with respect to the inner surface of the deflective reflecting wall 717 is shifted from the second optical axis 921. It is preferred that angle θ for the shift of the vertical axis from the second optical axis 921 is 15 to 30 degrees, and more preferably 20 to 25 degrees. With the present embodiment, the inner surface of the deflective reflecting wall 717 is a flat surface.

In FIG. 7, the second irradiation light from the second light-emitting element 92 reaches a primary reflection region 922 of the deflective reflecting wall 717 and is reflected. The primary reflected light produced by the reflection goes to the direction of a primary reflection axis 923 which is different from the direction in which the second irradiation light enters, reaches a secondary reflection region 924 and is reflected. Although the primary reflection region 922 and the secondary reflection region 924 are formed on the surface of the peripheral wall, they are illustrated as ellipses in FIG. 7 for convenience in the same way as FIG. 3. The secondary reflected light produced by the reflection goes to the direction of a secondary reflection axis 925, and is guided to the side of light-receiving element accommodation wall 714 which is opposite to the second light-emitting element 92. Therefore, the light-receiving element 93 does not receive light until the light becomes at least the secondary reflected light. The reflected light is absorbed in the black optical bench 71 every time the light is reflected, and therefore the reflected light after tertiary reflection significantly weakens. Consequently, it is possible to make a sufficient difference (SN ratio) in the amount of received light between the presence and the absence of smoke.

As described above, according to the present invention, the first light-emitting element 91 and the second light-emitting element 92 individually emit light to the light-receiving element 93, and therefore it is possible to detect fire and so forth. In each case, the second light-emitting element 92 or the first light-emitting element 91 is not needed. On the other hand, it is possible to detect smoke using both the first light-emitting element 91 and the second light-emitting element 92. The angle at which the scattered light of the light emitted from the first light-emitting element 91 enters the light-receiving element 93 is different from the angle at which the scattered light of the light emitted from the second light-emitting element 92 enters the light-receiving element 93. Then, it is determined whether the smoke is white or black based on the ratio between the forward-scattered light of the light emitted from the first light-emitting element 91 and the backward-scattered light of the light emitted from the second light-emitting element 92. When the smoke is black, an amount of the scattered light is small, and therefore the value of the forward-scattered light can be amplified to determine whether there is fire.

Figure 8:
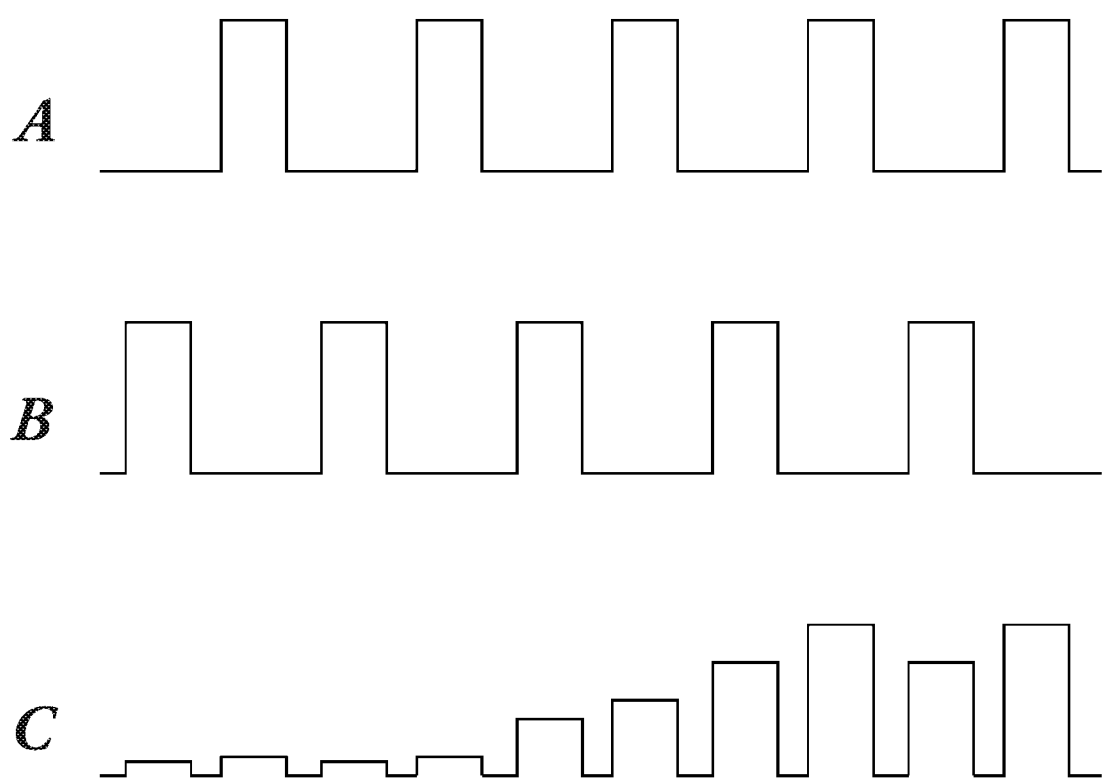
FIGS. 8A-8C illustrate amounts of emitted light, and an amount of received light by the forward-scattered light and the backward-scattered light according to an embodiment of the present invention.

FIGS. 8A-8C illustrate amounts of emitted light, and an amount of received light by the forward-scattered light and the backward-scattered light according to an embodiment of the present invention. FIG. 8A illustrates the light emitting by the first light-emitting element 91. FIG. 8B illustrates the light emitting by the second light-emitting element 92. FIG. 8C illustrates the light receiving by the light-receiving element 93. As illustrated in FIGS. 8A-8B, the phase of the light emitting of the first light-emitting element 91 is shifted from that of the second light-emitting element 92. The output of the light receiving of the light-receiving element 93 is distinguished between the receiving of the light from the first light-emitting element 91 and the receiving of the light from the second light-emitting element 92, based on the timing of the light emitting of each of the light-emitting elements.

The angle φ1 between the first optical axis 911 and the light receiving axis 931 to detect the forward scattering is an obtuse angle, and preferably 110 to 130 degrees. Meanwhile, the angle φ2 between the second optical axis 921 and the light receiving axis 931 to detect the backward scattering is an acute angle, and preferably 50 to 70 degrees. With the present embodiment, the first light-emitting element accommodation wall 712, the second light-emitting element accommodation wall 713, and the light-receiving element accommodation wall 714 surround the first light-emitting element 91 and so forth. However, another configuration is possible where there is no wall except the peripheral wall as long as light blocking effect is obtained. The deflective reflecting wall 717 has an effect by the angle of its inner surface in the horizontal direction, and the shape of its outer surface is not limited. In addition, the side wall 711 may not be formed in arc.

The inner surface of the deflective reflecting wall 717 may be a shallow concave surface, as long as the secondary reflected light is guided to the direction of the side surface of the light-receiving element accommodation wall. Although the embodiment using both the forward scattering and the backward scattering has been described, one of them may be practiced.

All the publications, patents and patent applications cited in the present specification shall be incorporated herein by reference in its entirety. Moreover, the disclosure of Japanese Patent Application No. 2019-051478 filed on Mar. 19, 2019, including the specification, claims and drawings, shall be incorporated herein by reference in its entirety.

REFERENCE SIGNS LIST 1 smoke detector, 2 smoke detector base, 3 first optical bench cover, 4 second optical bench cover, 5 cover body, 6 back plate, 5 optical bench plate, 8 circuit board, 10 smoke detection part, 31 cover disc, 32 smoke introduction fin, 33 leg, 34 snap piece, 35 cover opening, 36 thick-wall portion, 41 bottom, 42 air port, 43 connection column, 44 annular part, 45 engagement piece, 46 crisscross projecting plate, 51 cover outer ring, 52 support, 53 protection plate, 54 opening, 55 confirmation lamp window, 71 optical bench, 72 plate, 81 confirmation lamp, 91 first light-emitting element, 92 second light-emitting element, 93 light-receiving element, 710 upper surface plate, 711 side wall, 712 first light-emitting element accommodation wall, 713 second light-emitting element accommodation wall, 7131 light blocking plate, 714 light-receiving element accommodation wall, 715 snap convex portion, 716 secondary reflecting plate, 717 deflective reflecting wall, 718 connection wall, 719 upper surface light blocking plate, 721 screw hole, 722 light transmission hole, 723 cylindrical portion, 731 screw, 911 first optical axis, 912 primary reflection region, 913 primary reflection axis, 914 secondary reflection axis, 921 second optical axis, 922 primary reflection region, 923 primary reflection axis, 924 secondary reflection region, 925 secondary reflection axis, 931 light receiving axis

The invention claimed is:

1. A smoke detector comprising:
   a smoke introduction part;
   a smoke detection part provided above the smoke introduction part and surrounded on its side by a peripheral wall;
   a first light-emitting element; and
   a light-receiving element, wherein:
   the light-receiving element and the first light-emitting element are disposed in a position in which the light-receiving element receives forward-scattered light produced when smoke in the smoke detection part is irradiated with first irradiation light emitted from the first light-emitting element;
   a secondary reflecting plate is provided on a side of the first light-emitting element inside the peripheral wall, the secondary reflecting plate being configured to form secondary reflected light when the smoke detection part without smoke is irradiated with the first irradiation light; and
   the secondary reflecting plate receives primary reflected light resulting from reflection of the first irradiation light from the peripheral wall and reflects the primary reflected light, and then allows produced secondary reflected light to enter the light-receiving element.

2. The smoke detector according to claim 1, wherein:
   a second light-emitting element is disposed in a position in which the light-receiving element receives backward-scattered light produced when smoke in the smoke detection part is irradiated with second irradiation light emitted from the second light-emitting element;
   the peripheral wall includes a primary reflection region from which the second irradiation light emitted from the second light-emitting element is reflected when the smoke detection part without smoke is irradiated with the second irradiation light, the primary reflection region being a deflective reflecting wall configured to reflect the second irradiation light in a direction different from the direction in which the second irradiation light enters;
   the light-receiving element is accommodated in a light-receiving element accommodation wall projecting inside the peripheral wall; and
   the second irradiation light reflects from the deflective reflecting wall, and is guided to a side of the light-receiving element accommodation wall which is opposite to the second light-emitting element.

3. The smoke detector according to claim 2, wherein part of the deflective reflecting wall close to the light-receiving element projects outward.

4. The smoke detector according to claim 3, further comprising a light blocking plate between the first light-emitting element and the second light-emitting element,
   the light blocking plate including a flat surface along a direction in which the second light-emitting element faces.

5. The smoke detector according to claim 2, further comprising a light blocking plate between the first light-emitting element and the second light-emitting element,
   the light blocking plate including a flat surface along a direction in which the second light-emitting element faces.

* * * * *